W. F. LAMOREAUX & C. W. RENWICK.
PROCESS FOR RECOVERING ELEMENTAL SULFUR FROM SULFUR GASES.
APPLICATION FILED JUNE 21, 1913.
1,140,310. Patented May 18, 1915.
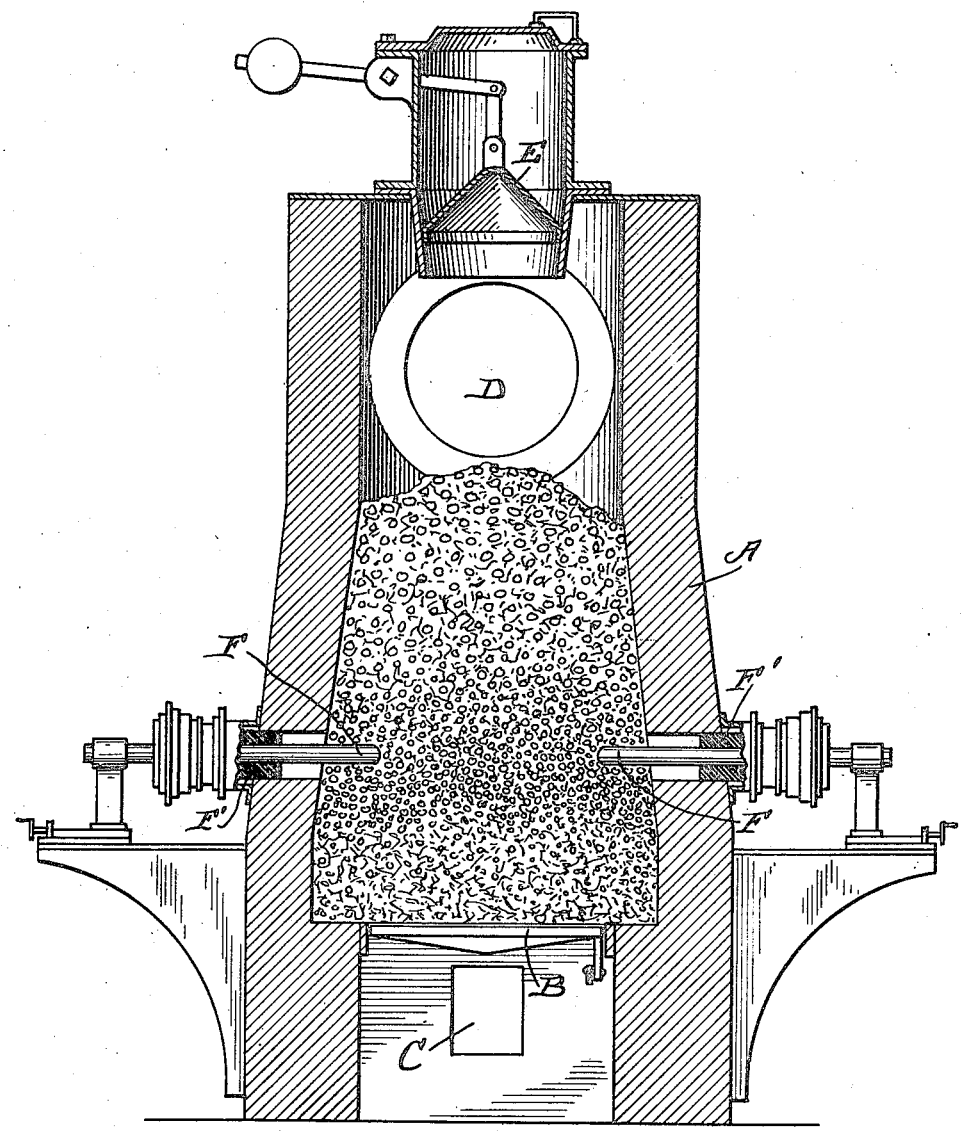

UNITED STATES PATENT OFFICE.

WILLIAM FRANCIS LAMOREAUX AND CHARLES WILLIAM RENWICK, OF ISABELLA, TENNESSEE.

PROCESS FOR RECOVERING ELEMENTAL SULFUR FROM SULFUR-GASES.

1,140,310. Specification of Letters Patent. Patented May 18, 1915.

Application filed June 21, 1913. Serial No. 774,970.

*To all whom it may concern:*

Be it known that we, WILLIAM F. LAMOREAUX, a citizen of the United States, and CHARLES W. RENWICK, a subject of Great Britain, both residing at Isabella, in the county of Polk and State of Tennessee, have invented a new and useful Process for Recovering Elemental Sulfur from Sulfur-Gases, of which the following is a specification.

Our invention relates to an improved process or method of recovering sulfur from gases and the objects of our improvement are first, to produce practically elemental sulfur from the oxids or other compounds of sulfur such as are contained in variable admixture with air in the gases generated by or liberated from any furnace smelting, roasting or calcining pyrite ores or other sulfur bearing materials; and second, to produce a very efficient and cheap process whereby the reactions are caused to take place completely and rapidly. We have attained these objects by the method described, illustrated and claimed in the following specification.

When gases in which sulfur exists in an oxidized condition (for example as sulfur dioxid) are passed through an incandescent layer or body of coke or other similar carbonaceous material, said sulfur compounds are decomposed with a resulting liberation of elemental sulfur. This reduction may be represented by the known reactions:—

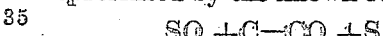

$$SO_2 + C = CO_2 + S$$

or

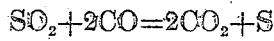

$$SO_2 + 2CO = 2CO_2 + S$$

In order that the reduction of these compounds to elemental sulfur may take place completely, rapidly and practically, we have found that a high temperature must be maintained within the layer or body of coke or other similar carbonaceous material.

As a specific example: in passing sulfur dioxid (contained in pyrite furnace gas) over a bed of coke heated to the required degree by an electric current passing through the same, it has been determined that when the period of time during which the gas and coke were in contact amounted to five seconds, practically 5% of the sulfur-dioxid was reduced at a temperature of 800° cent.; 34% was reduced at 900° cent.; 63% at 1,000° cent.; 91% at 1,100° cent.; 96% at 1,200° cent.; and 98% at 1,300° cent. Within the limits mentioned, the higher the temperature maintained, the more rapid will be the formation of the elemental sulfur. Also, the amount of sulfur formed is found to increase in proportion to the length of time during which the gases are in contact with the incandescent carbon. In other words, either an increase in the depth of the incandescent mass of carbon through which the gases pass or a decrease in the velocity of the gases in passing through such an incandescent mass of carbon will result in a greater percentage of elemental sulfur formed.

In practice it is found that the combustion of the carbon in the presence, or in an atmosphere, of such sulfur compounds as above referred to will not produce the required temperature for the reducing action to take place completely or with practical rapidity. When this heating effect is obtained solely by combustion of heat-producing materials the products of combustion will combine or mix with the gas to be treated and vitiate the desired results. In order to compensate for such deficiency of temperature, we make use of the heating effect of the electric current in passing through a mass of highly heated particles of carbon, or carbonaceous material, or through the vapor of carbon, as in the case of the electric arc. By the proper regulation of the amount of electric current, so used, any desired degree of temperature can be maintained, while at the same time the amount of carbon required for the reduction can be proportioned and supplied according to the amount of oxygen present in the sulfur gases treated, whether such oxygen exists in a free state or combined with the sulfur. In other words, we are enabled to regulate the temperature to the most efficient and practicable point, quite independently of the rate of heat-development by the combustion of the carbon. We accomplish this by supplying the increment of heat which is necessary to secure the practically complete reduction of the sulfur dioxid, from a source independent of the oxidation of the carbon by the gas-stream. Now, therefore, instead of depending solely upon the heat of reaction, as has been done heretofore, which is not sufficient in itself to maintain such elevated temperatures and other conditions required, and in order to produce and maintain such elevated temperatures and other conditions, we employ the heating and possibly electrolytic effects of an electric current by passing it through a mass of highly heated particles of carbon, or carbonaceous material, in the presence of the gases or in contact therewith, such periods of contact being uniformly maintained for a definite period of time at the temperature at which the reduction of the sulfur dioxid is nearly quantitative, or a sufficient approximation thereto for practical purposes. By our process then we produce an effect which we believe otherwise to be impossible. Our new process otherwise consists in subjecting the gas to the combined action of a mass of incandescent carbon particles and an electric current or arc simultaneously maintained within said mass of carbon particles at the required temperature produced not only by combustion but by an electric current or arc passing through the carbon. The body or mass of incandescent carbon, the arrangement of the means and forces employed to produce the rate of movement of the gas are preferably such as to cause the complete reduction of the gas within the time of its traversing said carbon mass.

By our new process we have effected a substantially complete liberation of the sulfur from its compounds by subjecting the gas to a temperature of 1300° cent. produced by passing the electric current through a mass of incandescent coke in the presence of the gas or in contact therewith, the gas and coke being in contact for a period of five seconds time, more or less, preceding condensation of the resulting product.

The process may be carried into effect by a furnace such as that represented in the accompanying sheet of drawing forming a part of this specification in which the figure shows a central vertical-section of an electric furnace in which A designates a furnace shaft having a grate B at the bottom. A gas inlet C is provided below the grate B and a gas exit D above the same. A body of coke particles is placed on the grate filling the furnace shaft up to the gas exit so that a current of gas passing in at the inlet will pass up through the coke and out to a condenser (not shown). The top of the furnace shaft is open and is provided with a removable cover E for filling the furnace with fine particles of coke. A flue is provided (but not shown) whereby the gas is drawn in at the inlet and up to the sulfur condenser (not shown) from which the products of combustion are discharged into a chimney (not shown). The electric circuit comprises conductors terminating in electrodes F which in the present instance enter through suitable openings at opposite sides of the furnace body in which suitable porcelain insulation tubes $F^1$ are placed to cause the electric current passing from one electrode to the other to pass through the body of coke in the furnace.

It will be understood that the size and shape of the furnace and its walls, the location and size of the inlet and outlet openings for the admission and escape of the gases, and whether said openings are so arranged as to cause the gases to pass vertically upward or downward or to pass horizontally through the carbon, the arrangement of the grates the sizes of the electrodes, the material of which they are composed, the method of adjusting and feeding of the furnace have no bearing on our metallurgical or chemical process, other than to show one way by which it is carried into effect and may be materially modified without in the least departing from the scope of our invention. The electric current employed to produce the required effect may be either direct or alternating.

We claim:—

1. The process of reducing sulfur dioxid to elemental sulfur, which consists in maintaining the sulfur dioxid in contact with incandescent carbon for a predetermined period, and supplying the increment of heat necessary to secure practically complete reduction of the sulfur dioxid from a source independent of the oxidation of said carbon.

2. The process of reducing sulfur dioxid to elemental sulfur, which consists in maintaining the sulfur dioxid in contact with incandescent carbon for a predetermined period, and supplying electrically the increment of heat necessary to secure practically complete reduction of the sulfur dioxid.

3. The process of reducing sulfur dioxid to elemental sulfur, which consists in passing the sulfur dioxid through a bed of incandescent carbon and maintaining it in contact therewith for a predetermined period, and supplying the increment of heat required to secure practically complete reduction of the sulfur dioxid by passing an electric current through said bed.

4. The process of reducing sulfur dioxid to elemental sulfur, which consists in maintaining the sulfur dioxid, commingled with atmospheric oxygen, in contact with incandescent carbon for a predetermined period, and supplying the increment of heat necessary to secure practically complete reduction of the sulfur dioxid from a source independent of the oxidation of said carbon.

5. The process of reducing sulfur dioxid to elemental sulfur, which consists in maintaining the sulfur dioxid, commingled with atmospheric oxygen, in contact with incandescent carbon for a predetermined period, and supplying electrically the increment of heat necessary to secure practically complete reduction of the sulfur dioxid.

6. The process of reducing sulfur dioxid to elemental sulfur, which consists in passing the sulfur dioxid, commingled with atmospheric oxygen, through a bed of incandescent carbon and maintaining it in contact therewith for a predetermined period, and supplying the increment of heat required to secure practically complete reduction of the sulfur dioxid by passing an electric current through said bed.

In testimony whereof we have signed our names to this specification in the presence of two subscribing witnesses this seventh day of June 1913, at Isabella, Tennessee.

WM. FRANCIS LAMOREAUX.
CHARLES WILLIAM RENWICK.

Witnesses:
J. L. SAPPINGTON,
G. B. FARISS.